United States Patent

[11] 3,615,177

[72] Inventors: Helmut Magerlein, Erlenbach; Gerhard Meyer, Obernburg; Hans-Dieter Rupp, Erlenbach, all of Germany
[21] Appl. No.: 769,148
[22] Filed: Oct. 21, 1968
[45] Patented: Oct. 26, 1971
[73] Assignee: Glanzstoff AG, Wuppertal, Germany
[32] Priorities: Oct. 21, 1967
[33] Germany
[31] P 15 92 340.7, P 15 92 341.8 and P 15 92 339.4

[54] PRODUCTION OF AQUEOUS AMMONIUM THIOCYANATE SOLUTIONS AND THIOCYANATE COMPOUNDS
21 Claims, 4 Drawing Figs.

[52] U.S. Cl. ............................................. 23/75, 23/181; 252/444
[51] Int. Cl. ............................................. C0/c 3/00, C0/b 11/16; C0/b 31/08
[50] Field of Search.................................. 23/75, 181; 252/444; 260/513.5

[56] References Cited

UNITED STATES PATENTS 2,850,356  9/1958  Southerland et al ...... 23/75

FOREIGN PATENTS 1,261  3/1881  Great Britain ........... 23/75

Primary Examiner — Oscar R. Vertiz
Assistant Examiner — Hoke S. Miller
Attorney — Johnston, Root, O'Keeffe, Keil, Thompson & Shurtleff ABSTRACT: Ammonia and carbon Disulfide are reacted at about 60–100° C. on an activated carbon, preferably in a continuous manner permitting high yields of a relatively pure ammonium thiocyanate or the corresponding alkali metal and alkaline earth metal thiocyanates.

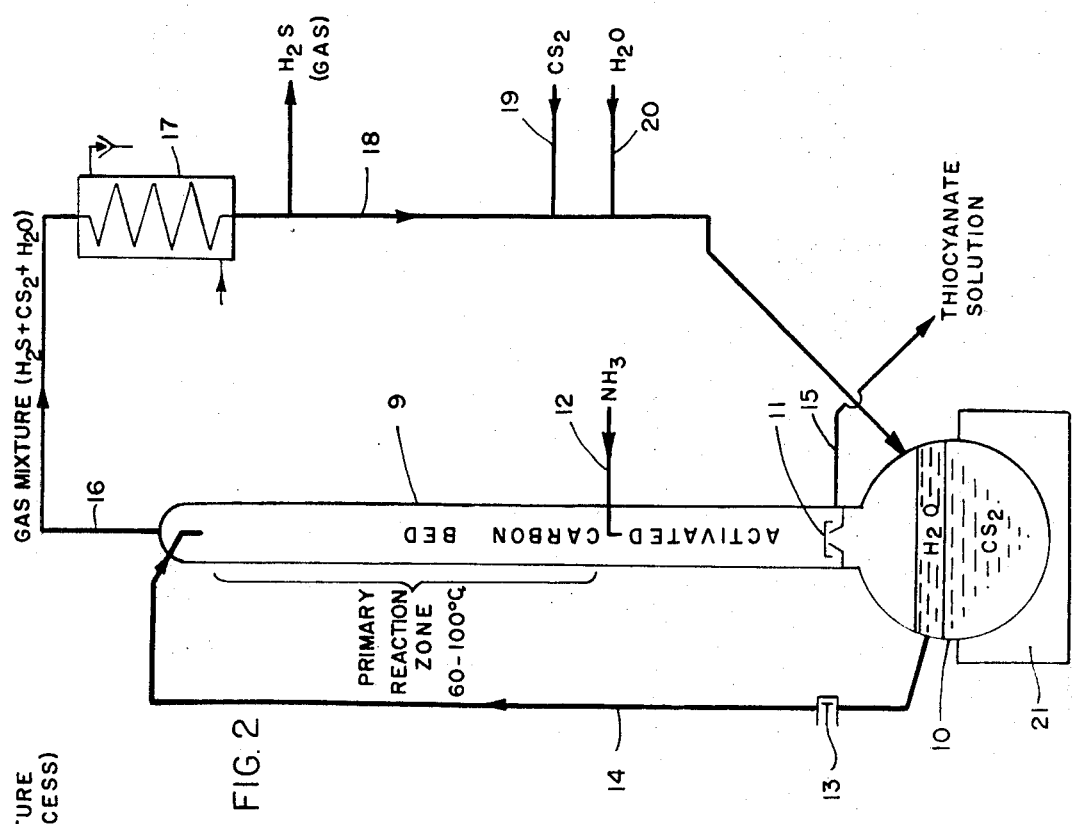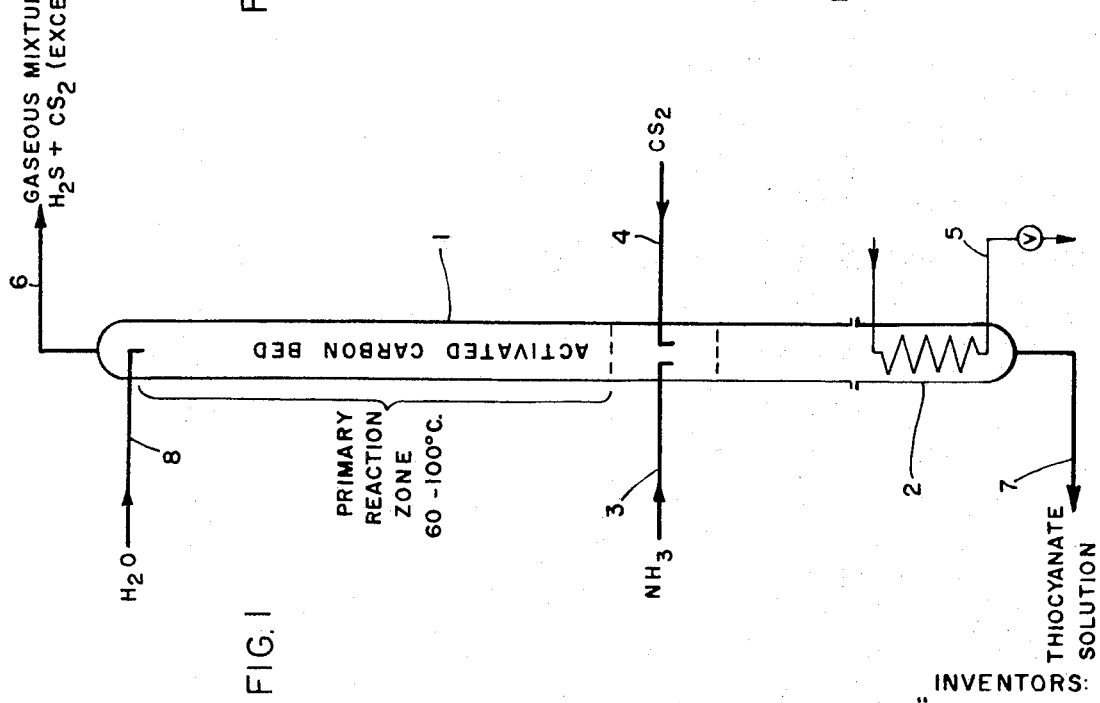

PRODUCTION OF AQUEOUS AMMONIUM THIOCYANATE SOLUTIONS AND THIOCYANATE COMPOUNDS

Processes are already known for the production of ammonium thiocyanate by reacting ammonia with carbon disulfide. Generally these processes are carried out in the absence of a catalyst and under pressure in a closed reaction vessel.

This reaction can also be carried out under normal pressure in the presence of a known catalyst (U.S. Pat. No. 2,209,962). When the catalysts, namely, fatty acids, their ammonium salts, higher alcohols or pine oil are employed, however, it is necessary to add a solution promoter for the carbon disulfide, e.g. ethanol. As a result, it becomes necessary to carry out a number of additional processing steps. The solution promotor must be separated by distillation from the reaction solution and can only be reused after undergoing a multistage purification process. The catalyst must also be separated from the reaction solution by an additional processing step. The catalyst can only be reused a few times because it becomes contaminated by sulfur, so that it loses its effectiveness and consequently must be discarded.

According to another known process (U.S. Pat. No. 2,850,356,), ammonia and carbon disulfide are both introduced under normal pressure into the central zone of a column which is filled with Raschig rings or similar inert filler bodies, a dilute ammonium thiocyanate solution simultaneously flowing down the column. The column is differently heated in three zones in such a way that a liquid medium is maintained in the central zone. The temperature is 70° to 95° C. in the lower zone, 40° to 70° C. in the central zone and 30° to 40° C. in the upper zone.

The reaction velocity when working by this latter process is relatively small. In addition, it is not possible to obtain a completely pure ammonium thiocyanate. It is of course possible by this method to produce ammonium thiocyanate which is free from ammonia, but the hydrogen sulfide which is formed during the reaction cannot be completely removed and as a consequence the ammonium thiocyanate solution always contains certain undesirable quantities of hydrogen sulfide. One object of the present invention is to provide a process for the production of ammonium thiocyanate or the corresponding alkali metal or alkaline earth metal thiocyanates in an aqueous medium by reacting ammonia and carbon disulfide in the presence of water on or in contact with a novel catalyst which permits high yields of the desired product in a relatively pure form. Another object of the invention is to provide a continuous conversion of ammonia and carbon disulfide into ammonium thiocyanate, and if desired, a further advantageious conversion into the corresponding alkali metal or alkaline earth metal thiocyanates. These and other objects and advantages of the invention are explained in much greater detail in the following specification.

In accordance with the invention, it has now been found that ammonia and carbon disulfide can be reacted in the presence of water to form an aqueous ammonium thiocyanate solution in a highly effective manner by conducting the reaction on or in contact with activated carbon, sometimes referred to as "active carbon," preferably in a continuous reaction zone filled or substantially filled with particles or granules of the activated carbon. Although it is feasible to conduct the reaction at temperatures above 100° C. under an elevated pressure sufficient to maintain water in the liquid state, the reaction of the present invention should normally be carried out at a temperature of about 60° C. to 100 C., usually not more than 90° C. and preferably about 70° C. to 85° C. Elevated pressures are not required at these temperatures so that the reaction is ideally suited to a continuous process under approximately normal pressure of one atmosphere.

The activated carbon employed as a novel catalyst in the reaction according to the invention is a generally well-known substance which has been employed extensively as an adsorbent or decolorizer and occasionally as a catalyst or a catalyst carrier. Its preparation is disclosed in many standard texts, using a wide variety of carbonaceous materials, preferably so as to obtain a vapor-adsorbent active carbon in the form of hard granules or particles, e.g. as produced from charcoal, briquetted coal, coconut shells, fruit pits and the like. The carbonaceous raw material is activated in a conventional manner, e.g. with an oxidizing gas, so as to greatly increase the surface area per unit weight of the carbon by the removal of hydrocarbons from the initial carbon surface. Many activating treatments for the preparation of a granulated active carbon are disclosed in the prior art, and further elaboration is not necessary here since the present invention does not reside in any specific activating treatment. On the other hand, it was quite surprising to discover the excellent catalytic effect of an activated carbon when reacting ammonia and carbon disulfide in the presence of water.

Most importantly, the reaction of the invention is readily adapted to a continuous operation in which ammonia and carbon disulfide are rapidly converted into an aqueous ammonium thiocyanate solution capable of being recovered substantially free of undesirable by products. This initial solution of the product can, if desired, be readily converted into a corresponding alkali metal or alkaline earth metal thiocyanates by reaction with an alkali metal hydroxide, preferably calcium, strontium or barium hydroxide. This secondary conversion into the alkali or alkaline earth metal thiocyanates is readily incorporated into the overall continuous process, and further has the advantage of releasing ammonia which can be directly used in the catalytic reaction with carbon disulfide.

In the simplest form, the process is preferably carried out in an elongated, generally vertical reaction tube substantially filled with a granulated active carbon, the tube being mounted above and in fluid connection with a distillation vessel, boiler or heating pot. Ammonia and carbon disulfide are conducted in the presence of water, preferably introducing steam below the reaction zone from the boiler, the reactants being conducted through the active carbon layer, preferably such that a temperature from about 60° to 100° C., advantageously from 70° to 85° C. is carefully maintained in the reaction zone. Certain advantages are gained, however, by conducting a continuous process in various different ways under controlled conditions as explained in greater detail hereinafter.

A number of preferred embodiments of the process of the invention, which are merely illustrative will now be described with reference to the accompanying drawings, in which:

FIG. 1 is a schematic representation of a simple apparatus for carrying out the process of the invention.

FIG. 2 illustrates an alternative apparatus for carrying out the process of the invention.

Figure 4:
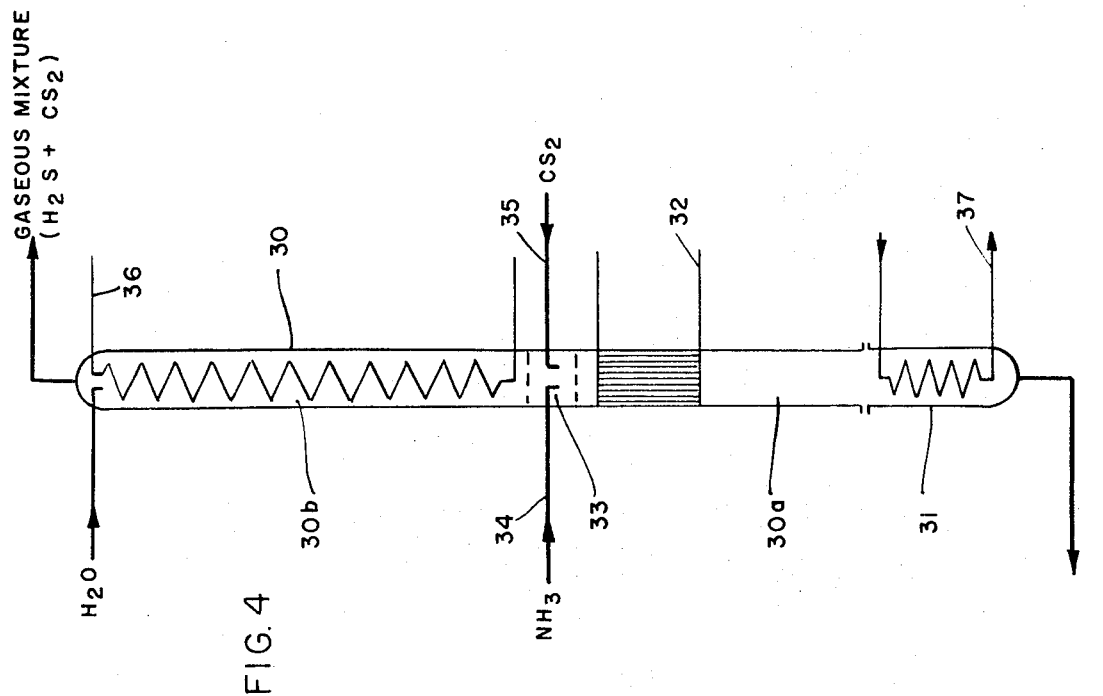
FIG. 4 illustrates another modified form of the apparatus shown in FIG. 1 provided with additional heating and cooling means.

It is especially advantageous to use an apparatus according to FIG. 1, which consists essentially of a reaction tube 1 which is filled with particles or granules of activated carbon, as conventionally arranged in a fixed catalyst bed or layer, and which is mounted on a distillation vessel or boiler 2. Ammonia is introduced through inlet pipe or conduit 3, in the form of either an aqueous solution or preferably as the free gas, and liquid or gaseous carbon disulfide is introduced through inlet pipe 4, the inlets for these materials being located approximately in the region of between one-quarter and one-half the way up the reaction tube.

The ammonia and the carbon disulfide are continuously introduced in a molar ratio of about 2:1.2 to 2:2, advantageously 2:12 to 2:1.5, and steam is simultaneously distilled upwardly from the vessel 2 into the reaction tube 1. By regulating the supply of heat to the distilling vessel with any suitable heating means 5 and/or by the provision of suitable heating or cooling elements in the reaction tube, preferably for indirect heat exchange, the major part or proportion of the steam should be caused to condense approximately at the level or the point of the entry where the ammonia and carbon disulfide are introduced into the reaction tube. Oxygen-free water is preferably additionally supplied from the top of the reaction tube through and inlet pipe 8.

Various reactions take place inside the reaction tube. These reactions are explained by the following reaction equations:

Addition of ammonia to carbon disulfide, with formation of ammonium dithiocarbamate:

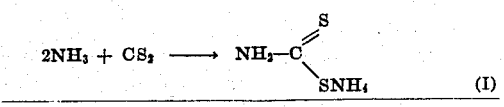

In addition, the presence of hydrogen sulfide, ammonium trithiocarbonate is formed: $2\ NH_3 + CS_2 + H_2S \longrightarrow (NH_4)_2CS_3$ Decomposition of ammonium dithiocarbamate and of ammonium trithiocarbonate into ammonium thiocyanate and hydrogen sulfide:

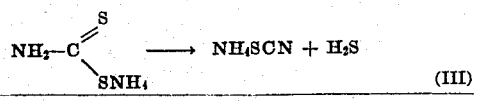

The hydrogen sulfide produced in the decomposition reactions III and IV forms ammonium hydrogen sulfide with ammonia, in accordance with equation V, in a secondary reaction:

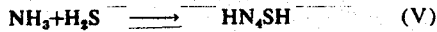

In the actual reaction zone, which is situated above the point of entry for ammonia and carbon disulfide, the reactions I and II take place predominately or to a large extent. In addition, substantial quantities of ammonium dithiocarbamate and ammonium trithiocarbonate are decomposed, according to reactions III and IV. In these reactions, a temperature range of 60° to 100° C. is desirable. The best results are obtained at about 70° to 85° C.

Below the reaction zone, that is to say, at the level or approximately the point of entry of the supply of the reactants, the temperature should normally be maintained at approximately 50° to 70° C. The ammonium thiocyanate solution, which contains ammonium hydrogen sulfide as well as ammonium dithiocarbamate and ammonium trithiocarbonate and which discharges or flows downwardly from the reaction zone, passes in the lower portion of the reaction tube into a zone in which the temperature is maintained between approximately 100° C. and the boiling point of the discharging ammonium thiocyanate solution, e.g. up to about 115° C. The greater part of the decomposition of the residual ammonium dithiocarbamate and ammonium trithiocarbonate takes place in this zone. At the temperatures encountered in this zone, the equilibrium of the reaction V is displaced towards the left, so that ammonium hydrogen sulfide is completely broken down into ammonia and hydrogen sulfide, and the two gases ascend into the reaction zone proper, i.e. the primary reaction zone.

Since ammonia is present in less than a stoichiometric quantity, there is no discharge of ammonium sulfide in the waste gas at the top of the reaction tube. The removal of the hydrogen sulfide from the ammonium thiocyanate solution is quantitative when the processing conditions as indicated above are maintained. The hydrogen sulfide is driven off together with excess carbon disulfide through the pipe 6 in an upward direction and removed from the reaction tube. The carbon disulfide can then be separated off in known manner from the gas mixture and returned or recycled to the reaction zone, e.g. in admixture with fresh carbon disulfide.

The aqueous ammonium thiocyanate solution is drawn off from the bottom of the distillation vessel or reboiler 2 through a pipe 7.

There are no restrictions in principle with respect to the diameter of the reaction tube. When using reaction tubes having not too large a diameter, for example, up to about 100 mm., no additional heating or cooling in the reaction zone is necessary, since the heat of reaction is dissipated by radiation. When using reaction tubes of larger diameter, for example, of 150 mm. or more, higher temperatures are set up in the interior of the active carbon layer above the supply pipes 3 and 4, since the heat of reaction is not sufficiently radiated.

This overheating tends to cause a reduction in the yield. If a reaction tube of relatively large diameter is fed with only such an amount of ammonia and carbon disulfide that the optimal temperature is not exceeded within the active carbon layer in the reaction zone, the layer of active carbon cannot be used to its full advantage. In order to maintain a temperature range of from 60° to 100° c., advantageously from 70°to 85° C., in the reaction zone of tubes having relatively large diameters, with effective utilization of the active carbon catalyst, it has been found to be especially desirable to regulate the temperature. This temperature control can be effected, for example, by means of condensers or similar indirect heat exchange tubes which extend uniformly through the active carbon layer (see examples 4 and 5 and FIG. 4).

The process can also be carried out using the apparatus which is shown in FIG. 2. The lower portion of a reaction tube 9 is filled with a granulated active carbon which is preferably heated. Carbon disulfide vapor is introduced through a liquid seal 11 from a distillation vessel or boiler 10 provided with a suitable heating means 21, and at the same time ammonia is continuously supplied through inlet pipe 12 one-third the way up the reaction tube. Water is extracted from a water layer floating on the carbon disulfide in the distillation vessel 10 through a pipe 14 equipped with a pump 13 and fed into the top of the reaction tube. The aqueous ammonium thiocyanate solution which is formed can then be discharged at or near the bottom end of the reaction tube through a pipe 15.

The gas mixture consisting essentially of hydrogen sulfide and a carbon disulfide-water azeotrope, which issues from the top of the reaction tube, passes thorough a pipe 16 to a cooling apparatus or condenser 17, in which hydrogen sulfide is separated off the carbon disulfide-water condensate is then returned to the distillation vessel through a pipe 18. In addition, pipes 19 and 20 for the measured or metered introduction of carbon disulfide and water open into this pipe 18. The temperature is also regulated in this process is 60° to 100° C., advantageously to 70° to 85° C., for example, by enclosing the reaction tube in a jacket through which a liquid of appropriate temperature flows. The temperature below and/or at the entry point of the ammonia is preferably about 50°–70° C., although the lower or bottom end of the reaction tube can be maintained at a somewhat higher temperature, e.g. 80—100°C.

When carrying out this embodiment of the invention as illustrated in FIG. 2, the primary reaction in accordance with equations I and II takes place in the carbon layer or bed above the inlet position for ammonia. The decomposition according to the equations III and IV occurs mostly below the ammonia inlet position, e.g. at temperatures of 80°—110° C.

The efficiency of the reaction tubes is to a certain extent dependent on the length of the individual zones. It is readily apparent that the yield per unit time are higher as the size of the primary reaction zone increases. Since the length of this zone depends on the position at which the ammonia is supplied and possibly the position at which the carbon disulfide is supplied, it is advisable to arrange for these inlet pipes to open or enter into the tube at as low a point as possible. On the other hand it is necessary to have available a sufficient layer of activated carbon, if complete decomposition of the additionally formed compounds ammonium dithiocarbamate, ammonium trithiocarbonate and ammonium hydrogen sulfide is to occur and if the hydrogen sulfide is to be driven off by the steam or vapors rising through the reaction zone.

It is found that the most favorable conditions are attained if the supply pipes for ammonia and possibly carbon disulfide open into the tube approximately one-third of the way up the reaction tube.

If ammonia and possibly carbon disulfide are introduced at a higher position in the reaction tube, then the yield per unit of time correspondingly falls. However, even when they are introduced up to about half way up the reaction tube, better throughputs are still achieved than with the known processes. The lower limits for the supply of ammonia and possibly carbon disulfide lies somewhat above one-quarter the way up the reaction tube, it being understood that carbon disulfide can enter at the bottom of the tube in which case the inlet for ammonia becomes the critical location.

It is not necessary for the entire reaction tube to be filled with activated carbon in order that the apparatus described above will function properly. In fact, it is actually carbon in the reaction tube, e.g. between an upper and a lower layer of the activated carbon. This modification offers the advantage in a commercial installation that that section of the apparatus which contains the inlet position can be manufactured as an insertable unit, thus simplifying maintenance and repair work. (See FIGS. 1 and 4 where the broken lines enclose this optional and often preferred free space.)

Figure 3:
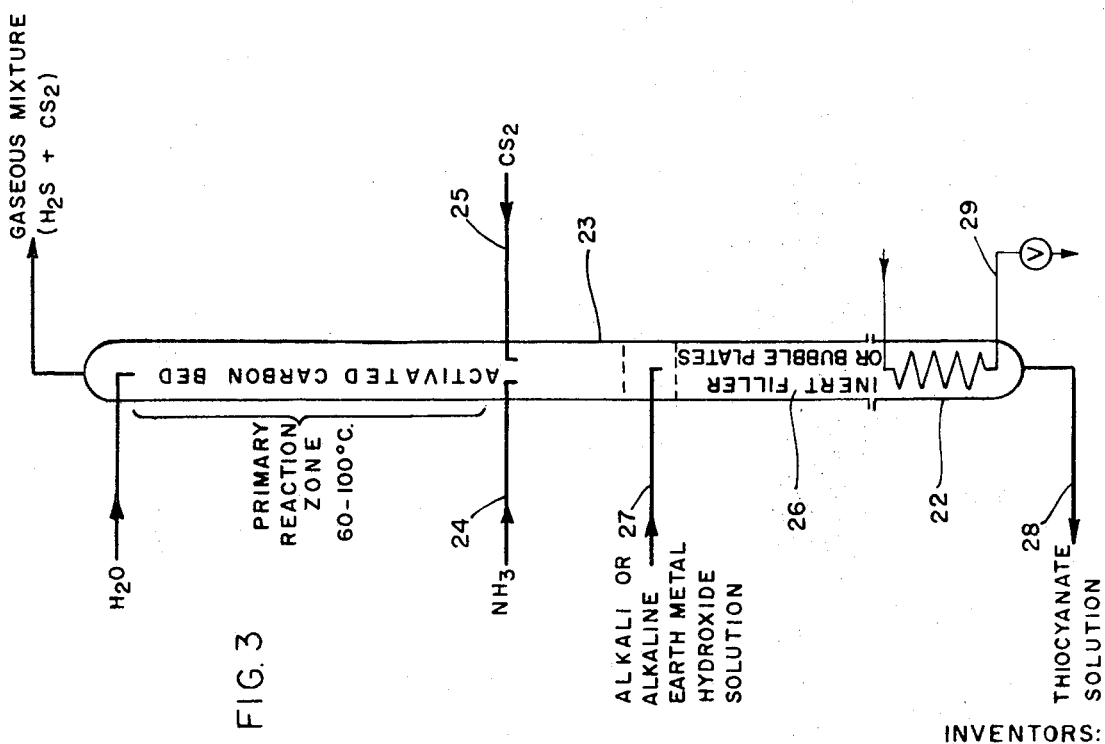
FIG. 3 illustrates the apparatus of FIG. 1 further modified for the in situ production of alkali metal and alkaline earth metal thiocyanates.

The purity of the ammonium thiocyanate solution which can be produced by the process of the invention is sufficient for it to be reacted directly with an alkali metal or an alkaline earth metal hydroxide to form the corresponding alkali metal or alkaline earth metal thiocyanate. Both the production of the ammonium thiocyanate and the conversion thereof into the alkali or alkaline earth thiocyanates can optionally and quite advantageously take place simultaneously in a single apparatus. FIG. 3 illustrates such an apparatus and it can be seen that it differs only slightly from the arrangement shown schematically in FIG. 1. Thus, the apparatus essentially comprises a distillation vessel or boiler 22 with an adjustable heating system 29 and with the reaction tube 23 connected thereto. Between the distillation vessel 22 and the active carbon bed 23 into which the inlet pipes 24 and 25 open for introducing ammonia and carbon disulfide, a space 26 equipped with inert filler bodies or bubble plates is provided to provide surfaces for a flowing liquid-gas interface. An aqueous alkali or alkaline earth hydroxide solution is introduced above this space 26 through a pipe 27. the ammonium thiocyanate solution formed in the active carbon layer flows downwardly and is reacted in the filler body or bubble plate zone with the hydroxide solution to form the corresponding alkali metal or alkaline earth metal thiocyanate solution which is then drawn off from the bottom of the distillation vessel through a pipe 28.

The reaction of the ammonium thiocyanate with the alkali or alkaline earth hydroxides takes place according to the equations:

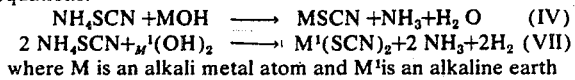

where M is an alkali metal atom and $M^1$ is an alkaline earth metal atom.

The ammonia liberated during these reactions is driven off so as to flow countercurrently up the tube section 26 and reacts with carbon disulfide in the activated carbon bed 23. Since half of the ammonia introduced into the active carbon zone 23 is continuously reformed or liberated in the filler body or bubble plate zone 26, as will be apparent from the reactions above, the external supply of the ammonia can be adjusted after a certain starting period to a ratio of about 1:1.2 to 1:2 mols of ammonia to mols of carbon disulfide.

It has been found desirable to control the supply of the hydroxide solution by means of a suitable apparatus for measuring pH values. The discharging alkali metal or alkaline earth metal thiocyanate solution should preferably have a pH value from 6 to 8.

Another modification of the apparatus shown in FIG. 1 is illustrated in FIG. 4 of the accompanying drawings in which an insulated reaction tube 30 with a length of 9 m. and having an internal diameter of 200 mm., which is fitted to a distillation vessel 31 provided with an adjustable heating system 37, is filled to a point one-third the way up the tube with active carbon (grain size =3.5 –4 mm.) to provide a first or lower activated carbon bed 30a. A flat tubular condenser or heat exchanger 32 with a cooling surface of about 1 $m^2$ lies within the upper portion of the first activated carbon bed. A space 33 which is free from active carbon and which is about 10 cm. high is situated above the condenser 32 adjacent the first carbon bed 30a, the supply pipes 34 and 35 for ammonia and carbon disulfide, respectively, opening into this space.

A filling or bed of activated carbon 30b having a height of 6 m. lies directly above the inlets for ammonia and carbon disulfide. This activated carbon bed or layer 30b contains cooling tubes 36 extending uniformly therethrough, employing a cooling water at about 45° C. which passes through the tubes for indirect heat exchange.

Apart from the fact that the process according to the invention is outstanding in forming a very pure ammonium thiocyanate, extraordinarily high yields per unit of volume and time are also obtained. When observing the working conditions of the known proceses, it is impossible to produce even approximately equally favorable results. When using reaction tubes with Raschig rings and similar inert bodies or when using the known catalysts, the progress of the reaction cannot be controlled in such an extremely advantageous manner as when using a filling or bed consisting essentially of an activated carbon in accordance with the present invention.

A particular advantage of this invention over the known process described in U.S. Pat. No. 2,249,962 is that the present process allows a very desirable continuous working procedure. Moreover, in contrast to the catalytic efficiency of the known catalysts, the efficiency of the activated carbon does not drop even after a long operating period. Furthermore, the reaction of carbon disulfide and ammonia takes place in the absence of a liquid solution promoter for carbon disulfide. This obviates any subsequent processes or steps for separating the solution promoter, the catalyst and the reaction solution and also avoids the costly process of recovering the solvent, all of these steps being necessary when using known working procedures.

In comparison with the known process described in U.S. Pat. No. 2,850,356, the temperature control, i.e. heating or cooling of the reaction tube, is substantially simplified. If the process of the invention is carried out in reaction tubes with a diameter up to 100 mm., a special heating or a cooling arrangement is not necessary. When using reaction tubes with diameters of 150 to 200 mm. or more, it is only necessary in order to control the temperature to cool the active carbon layer above the point of inlet of the reactants.

The thiocyanate solutions as prepared according to the invention can be simply evaporated in order to recover the particular ammonium, alkali metal or alkaline earth metal thiocyanate in very pure form, observing only normal precautions. These thiocyanates are well-known useful compounds having a wide range of commercial applications.

In order that the invention may be more fully understood, the following examples are given solely by way of illustration:

EXAMPLE 1

The apparatus used was that shown schematically in FIG. 1 of the accompanying drawings.

An insulated reaction tube 1,300 mm. long and having an internal diameter of 40 mm., which was mounted on the distillation vessel 2 equipped with the adjustable heating system 5, was filled with a granulated active carbon (grain size 3.5 –4 mm.) which was then thoroughly wetted with water. Water passed into the reaction tube passed from the distillation vessel in such a way that the major part of the water vapor condensed 400 mm. above the bottom of the tube. The two inlet pipes 3 and 4 for gaseous ammonia and carbon disulfide, respectively, opened into the tube at this point.

Before commencing the process, the reaction tube was flushed with inert gas or steam until free from oxygen.

The apparatus was charged as follows:
34 liters of ammonia per hour.
75 g. of carbon disulfide per hour.

60 ml. of oxygen-free water per hour (through supply pipe 8 at the top of the reaction tube).

An approximately 50 percent ammonium thiocyanate solution, corresponding to the quantity of water used, was drawn off through the pipe 7. After evaporating the solution to dryness, the product obtained was found by titration with silver nitrate to have an ammonium thiocyanate content of 99.4 percent. A yield of 57.3 g. of ammonium thiocyanate per hour was obtained (99.7 percent of the theoretical, calculated on ammonia). Thus, 34.9 g. of ammonium thiocyanate were obtained per hour and per liter of active carbon.

EXAMPLE 2

The apparatus used was that shown schematically in FIG. 2 of the accompanying drawings.

The reaction tube consisted of a double-jacketed glass tube with a length of 600 mm. and an internal diameter of 30 mm. It was heated to 80° C. and filled with particles of an activated carbon (grain size =2.5 mm.).

In order to avoid the formation of sulfur during the reaction, the double-jacketed tube had to be flushed free from oxygen by means of an inert gas or steam before the process was commenced; it was likewise necessary to use oxygen-free water.

Eight liters of ammonia gas per hour were introduced through the gas inlet pipe 12, which opened into the double-jacketed glass tube at a point 200 mm. above the bottom thereof. The boiling operation in the distillation vessel was so controlled by means of the heating system that 15-20 grams of carbon disulfide per hour distilled upwardly into the reaction tube 9. At the same time 15 ml. of water per hour were delivered to the upper end of the active carbon bed in tube 9. This water flow downwardly and was drawn off from the distilling vessel 10 where it floated on the $CS_2$ layer.

Carbon disulfide and water were continuously introduced by way of the pipes 19 and 20, respectively, in amounts corresponding to those which were used up while the apparatus was in continuous operation.

The ammonium thiocyanate solution formed had a concentration of about 50 percent was continuously withdrawn through the pipe 15.

After evaporating the solution to dryness, the product obtained had an ammonium thiocyanate content of 99.2 percent, as determined in an argentometer.

A yield on average of 13.4 g. of ammonium thiocyanate per hour was obtained (99.5 percent of the theoretical, calculated on $NH_3$).

This corresponds to a anammonium thiocyanate yield of 31.8 g. per hour and per liter of activated carbon.

EXAMPLE 3

The apparatus used was that shown schematically in FIG. 3 of the accompanying drawings.

The insulated reaction tube 23 having a length of 4,000 mm. and an internal diameter of 100 mm., which tube was arranged on a distilling vessel 22 equipped wit an adjustable heating system 29, was filled in the lower quarter 26 with Raschig rings and in the remaining three-quarters with a granulated activated carbon (grain size =3.5 -4 mm.), which was then thoroughly wetted with water. The inlet pipe 27 for an aqueous sodium hydroxide solution was situated beneath the active carbon zone. The supply pipes 24 and 25 for gaseous ammonia and carbon disulfide opened into the pipe at a point one-third the way up the active carbon zone 23. Before the process was operated, the reaction tube was flushed free from oxygen with inert gas or steam.

Water was distilled into the reaction tube from the distillation vessel 22, the supply of heat being so regulated that the major part of the steam condensed at or beneath the inlet of the supply pipes 24 and 25 for ammonia and carbon disulfide. The apparatus was charged as follows:

450 liters of ammonia per hour,
1,100 ml. of carbon disulfide per hour,
850 ml. of oxygen-free water per hour
(supplied at the top of the reaction tube.)

As soon as the ammonium thiocyanate solution formed in the active carbon zone had run downwardly until it reached the level of the point of introduction of the sodium hydroxide solution, the ammonia supply was reduced to 224 liters per hour, and 525 ml. per hour of a 50 percent aqueous sodium hydroxide solution were introduced. The sodium thiocyanate solution which had formed was continuously drawn off through the pipe 28. After evaporating the solution to dryness, the product obtained had an NaSCN-content of 99 percent, determined by means of an argentometer. The yield amounts to 807 g. of NaSCN per hour (99.7 percent of the theoretical, calculated on $NH_3$). Thus, 34.2 g. of NaSCN were obtained per hour and per liter of activated carbon used in the catalyst bed.

Similar results are achieved by using a potassium hydroxide solution or the hydroxides of calcium, strontium or barium in place of sodium hydroxide, thereby obtaining the corresponding metal thiocyanates.

EXAMPLE 4

The apparatus used is that shown schematically in FIG. 4 of the accompanying drawings.

About 20 liters of water were boiled per hour from the distillation vessel, and the steam was condensed on the tubular cooler or heat exchanger 36 in which water was circulated at a temperature of 46° C. The apparatus was charged as follows:

4,500 g. of ammonia per hour,
15,000 g. of carbon disulfide vapor per hour,
12,300 g. of oxygen-free water per hour.

An approximately 45 percent ammonium thiocyanate solution was drawn off from the distilling vessel corresponding to the quantity of water supplied. After evaporating the solution to dryness, a product was obtained with an argentometrically determined $NH_4SCN$-content of 99.5 percent. The yield was about 10 kg. of $NH_4$ SCN per hour. Thus, 35.58 g. of $NH_4SCN$ were obtained per hour and per liter of active carbon.

EXAMPLE 5

The reaction tube was the same as that in example 4 but without the cooling arrangement in the upper 6 meter carbon layer, the apparatus being charged as follows:

2,600 g. of ammonia per hour,
8,700 g. of carbon disulfide per hour,
7,100 g. of water per hour.

The yield was about 5,800 g. of ammonium thiocyanate per hour. Thus, only 20.5 g. of $NH_4SCN$ were obtained per hour and per liter of active carbon.

When the particular form of apparatus was charged with larger quantities of ammonia and carbon disulfide, ammonia and subliming ammonium trithiocarbonate were discharged at the top of the reaction tube. Accordingly, although the process is operable when conducted without careful control of the reaction temperature, the results are much less desirable.

It will be recognized from the foregoing description and examples that the process of the invention can be carried out in a variety of modified procedures, although it is naturally preferred to employ a continuous operation which also permits by-products or impurities to be destroyed or else separated in a very convenient manner. At the same time, the invention should not be limited to specific preferred embodiments except as defined without the spirit and scope of the accompanying claims.

The invention is hereby claimed as follows:

1. A process for the production of an aqueous ammonium thiocyanate solution which comprises reacting ammonia and carbon disulfide at an elevated temperature of about 60° C. to 100° C., in the presence of water and in contact with activated carbon.

2. A process as claimed in claim 1 wherein said reaction is carried out at a temperature of from about 70 to 85° C.

3. A process as claimed in claim 1 wherein the molar ratio of ammonia: disulfide is about 2:1.2 to 2:2.

4. A process as claimed in claim 1 wherein said reaction is carried out continuously in a reaction zone containing particles of activated carbon as a catalyst layer at a temperature of about 60° C. to 100° C.

5. A process as claimed in claim 4 wherein ammonia and carbon disulfide are introduced into said reaction zone in a molar ratio of about 2:1.2 to 2:1.5.

6. A process as claimed in claim 4 wherein the ammonia and carbon disulfide in a molar ratio of about 2:1.2 to 2:2 are introduced together to an elongated substantially vertical reaction tube, which is substantially filled with said activated carbon, at a point between about one-quarter to one-half the way up said reaction tube, steam is supplied at the bottom of said reaction tube with heat supply to the reaction tube being so controlled as to condense the major proportion of steam below the point of entry of said ammonia and carbon disulfide into said reaction tube, withdrawing a thiocyanate solution at the bottom of said reaction tube and drawing off hydrogen sulfide and excess carbon disulfide from the top of said reaction tube.

7. A process as claimed in claim 6 wherein said ammonia and carbon disulfide are introduced at a point approximately one-third way up from the bottom of said reaction tube.

8. A process as claim in claim 6 wherein said ammonia and carbon disulfide are introduced into a space in said reaction tube which is free of activated carbon and between an upper and lower layer of activated carbon particles.

9. A process as claimed in claim 6 wherein the reaction zone of said ammonia and carbon disulfide located above their point of entry is maintained at a temperature of about 70 to 85° C. and the temperature at said point of entry is maintained at about 50° to 70° C.

10. A process as claimed in claim 9 wherein the temperature in the lower portion of said reaction tube below said point of entry of ammonia and carbon disulfide is maintained at a temperature between about 100° C. and the boiling point of the discharging thiocyanate solution.

11. A process as claimed in claim 4 wherein ammonia is introduced into an elongated substantially vertical reaction tube, which is substantially filled with said activated carbon, at a point between about one-quarter and one-half the way up said reaction tube, carbon disulfide and water are distilled from a distillation vessel for introduction at the bottom of said reaction tube upwardly though a layer of said activated carbon, a gaseous mixture of hydrogen sulfide and a carbon disulfide-water azeotrope is withdrawn at the top of said reaction tube and an aqueous thiocyanate solution is drawn off at the bottom of said reaction tube.

12. A process as claimed in claim 11 wherein hydrogen sulfide is separated from the gaseous mixture withdrawn at the top of said reaction tube and the carbon disulfide and water are recycled to said distillation vessel.

13. A process as claimed in claim 11 wherein said ammonia is introduced at a point approximately one-third the way up said reaction tube.

14. A process as claimed in claim 11 wherein the reaction zone for said ammonia and carbon disulfide located above the point of entry of the ammonia is maintained at a temperature of about 70° to 85° C. and the temperature at the point of entry of said ammonia is maintained at about 50° to 70° C.

15. A process as claimed in claim 14 wherein the temperature in the lower portion of said reaction tube below the point of entry of said ammonia is maintained at a temperature between about 80° C. and the boiling point of the discharging thiocyanate solution.

16. A process claimed in claim 1 wherein the resulting ammonium thiocyanate in aqueous solution is further reacted with a compound selected from the class consisting of alkali metal and alkaline earth metal hydroxides, thereby forming the corresponding alkali metal or alkaline earth metal thiocyanate.

17. A process as claimed in claim 16 wherein the aqueous ammonium thiocyanate solution is reacted with an aqueous hydroxide solution of an alkali metal selected from the class consisting of sodium and potassium.

18. A process as claimed in claim 16 wherein the aqueous ammonium thiocyanate solution is reacted with an aqueous hydroxide solution of an alkaline earth metal selected from the class consisting of calcium, strontium and barium.

19. A continuous process as claimed in claim 4 wherein the reaction between ammonia and carbon disulfide takes place in an approximately vertical first reaction zone between substantially filled with activated carbon particles, and the resulting aqueous ammonium thiocyanate solution flowing downwardly from said reaction zone is reacted with an aqueous hydroxide solution of a metal selected from the class consisting of alkali metals and alkaline earth metals in a separate reaction zone.

20. A continuous process as claimed in claim 19 wherein said first reaction zone for said ammonia and carbon disulfide is in direct fluid connection with said separate reaction zone which is free of catalyst and is arranged to receive the downwardly flowing aqueous solution over an extended surface having a liquid-gas interface, and ammonia expelled from said aqueous solution in said separate reaction zone flows countercurrently upwardly into said first reaction zone.

21. A process as claimed in claim 6 wherein there is introduced into the reaction tube, between the point of supply of steam and the point of entry of the ammonia and carbon disulfide, an aqueous alkaline solution of a compound selected from the class consisting of alkali metal and alkaline earth metal hydroxides for reaction with the ammonium thiocyanate passing downwardly through said reaction tube.

* * * * *

PO-1050
(5/69)

UNITED STATES PATENT OFFICE
CERTIFICATE OF CORRECTION

Patent No. 3,615,177          Dated October 26, 1971

Inventor(s) Helmut Magerlein, Gerhard Meyer, and Hans-Dieter Rupp

It is certified that error appears in the above-identified patent and that said Letters Patent are hereby corrected as shown below:

First page, right-hand column, in the references, insert
-- 3,409,399    11/1968    Bertozzi et al....    252/444 --.

Column 1, line 40, a new paragraph should be started with "One"; line 50, "advantageious" should read -- advantageous --; line 65, "100 C.," should read -- 100° C., --.

Column 2, line 21, "a" should read -- the --; line 70, "2:12" should read -- 2:1.2 --.

Column 3, line 16, "(NH$_4$2CS$_3$" should read -- (NH$_4$)$_2$CS$_3$ (II) --; line 26, "H$_2$S" should read -- 2H$_2$S --; line 31, "HN$_4$SH" should read -- NH$_4$SH --.

Column 4, line 37, "thorough" should read -- through --; line 39, "off the" should read -- off and the --; line 44, "is 60°" should read -- to 60° --; line 60, "yield" should read -- yields --.

Column 5, line 17, "position" should read -- positions --; line 41, "the" should read -- The --; line 51, "2H$_2$" should read -- 2H$_2$O --.

Column 7, line 44, "13.4" should read -- 13.5 --; line 56, "wit" should read -- with --.

Column 10, line 31, claim 19, delete "between".

Signed and sealed this 30th day of May 1972.

(SEAL)
Attest:

EDWARD M. FLETCHER, JR.
Attesting Officer

ROBERT GOTTSCHALK
Commissioner of Patents